Oct. 7, 1947.  C. F. SCHORN  2,428,531
POWER CONTROL
Filed May 17, 1943  8 Sheets-Sheet 1

Carl F. Schorn
INVENTOR.

BY
ATTORNEY

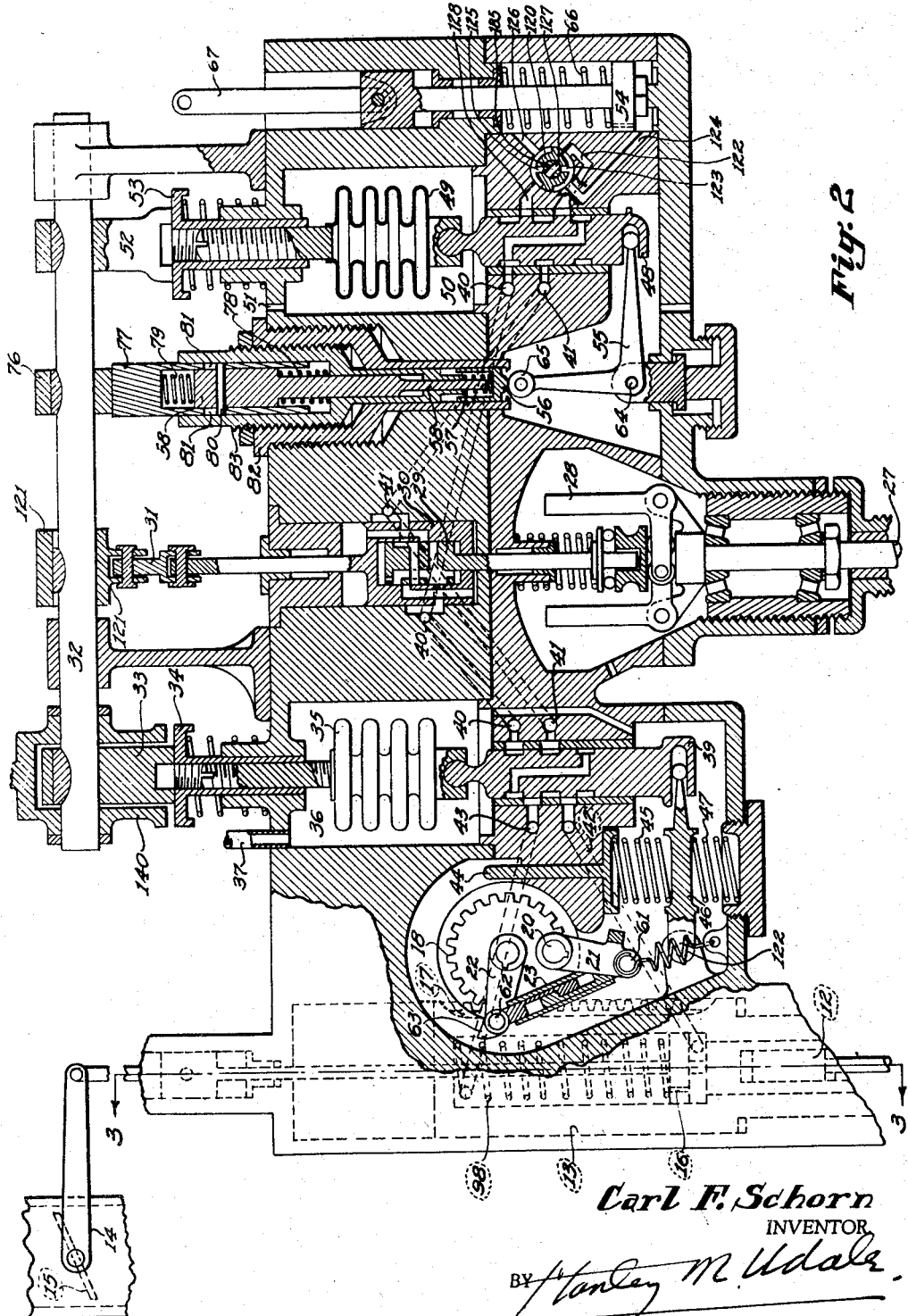

Oct. 7, 1947.  C. F. SCHORN  2,428,531
POWER CONTROL
Filed May 17, 1943  8 Sheets-Sheet 3
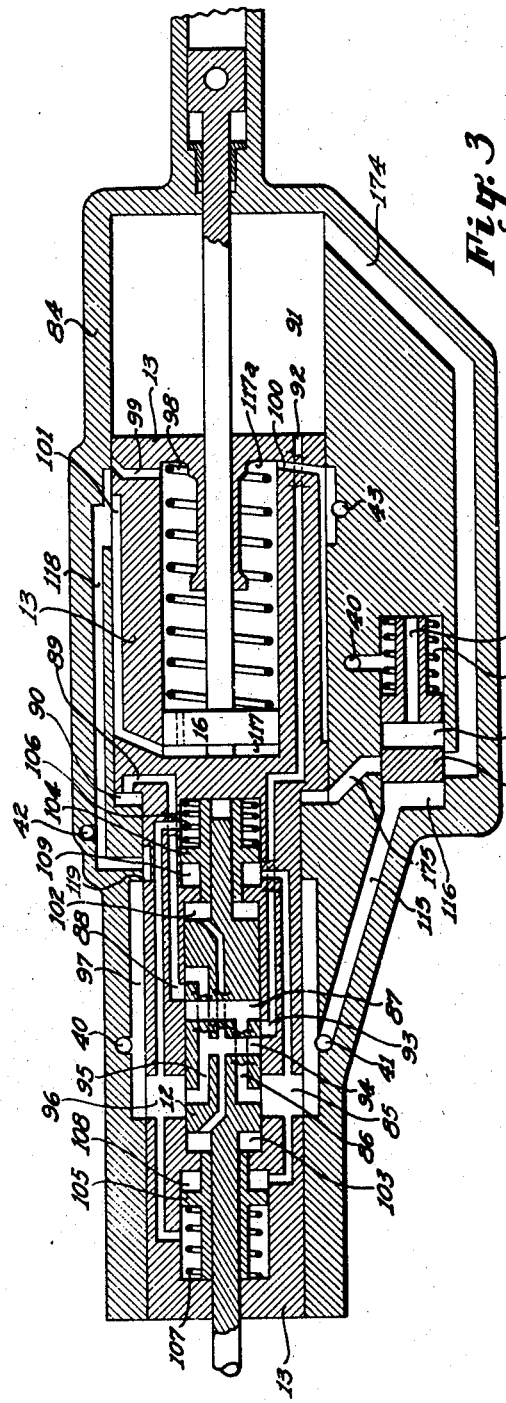
Fig. 3
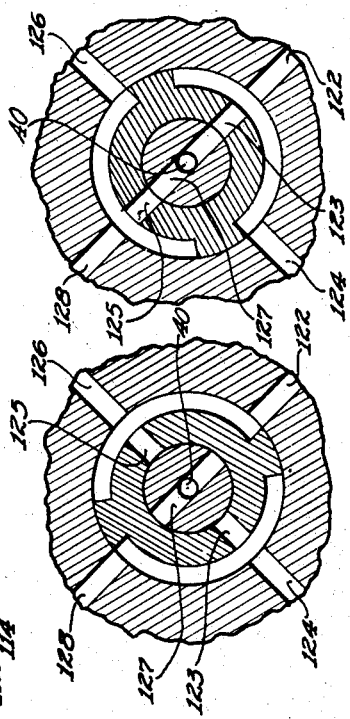
Fig. 10
Fig. 11
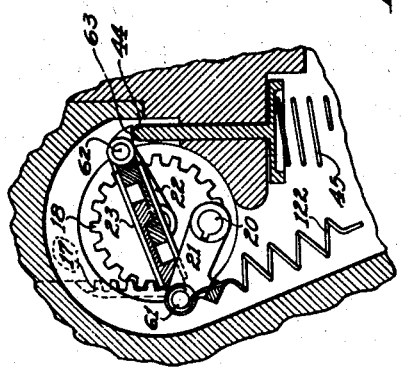
Fig. 4
Carl F. Schorn
INVENTOR.
BY
ATTORNEY Oct. 7, 1947.   C. F. SCHORN   2,428,531
POWER CONTROL
Filed May 17, 1943   8 Sheets-Sheet 4
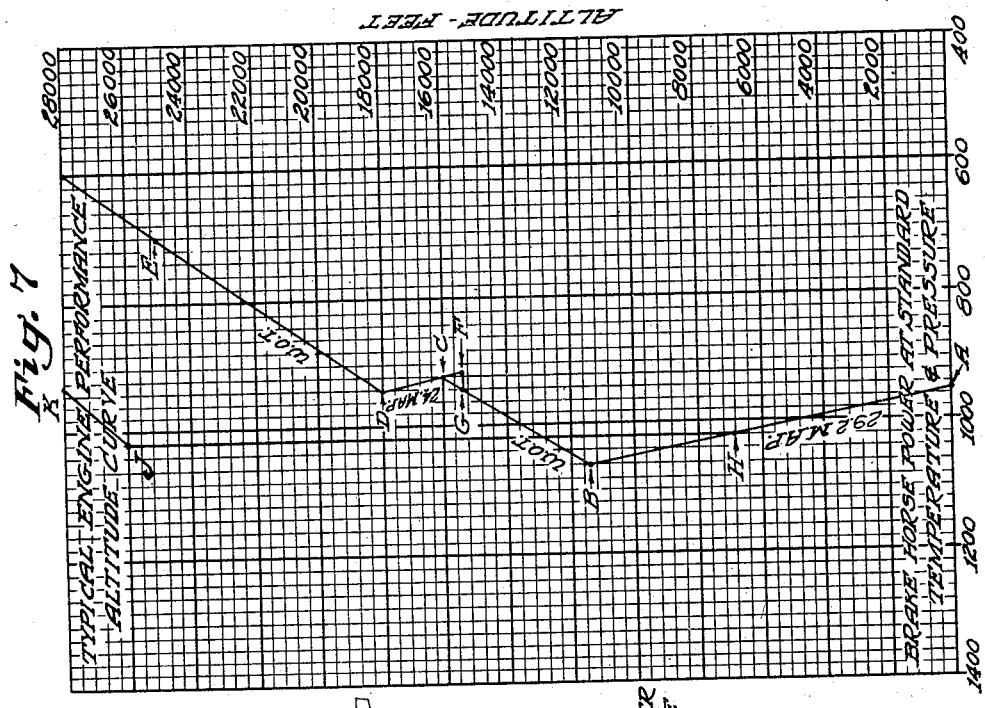
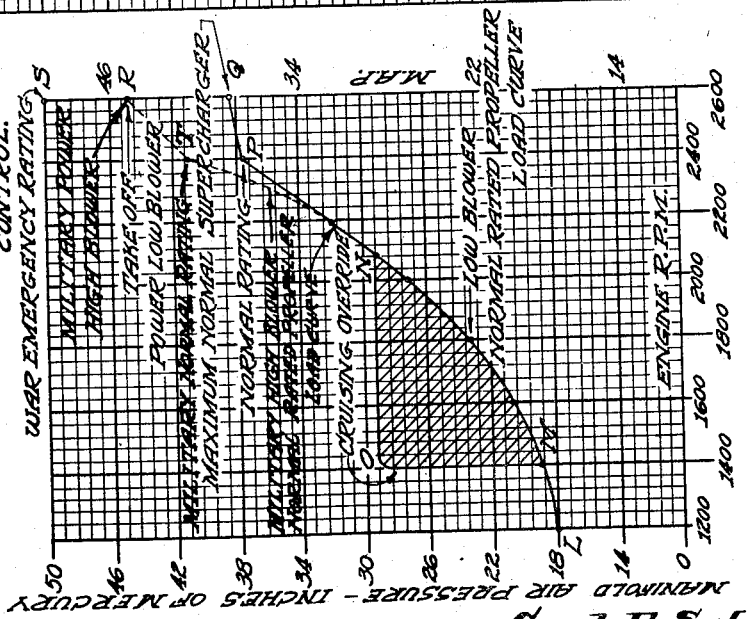
Carl F. Schorn
INVENTOR.
BY
ATTORNEY

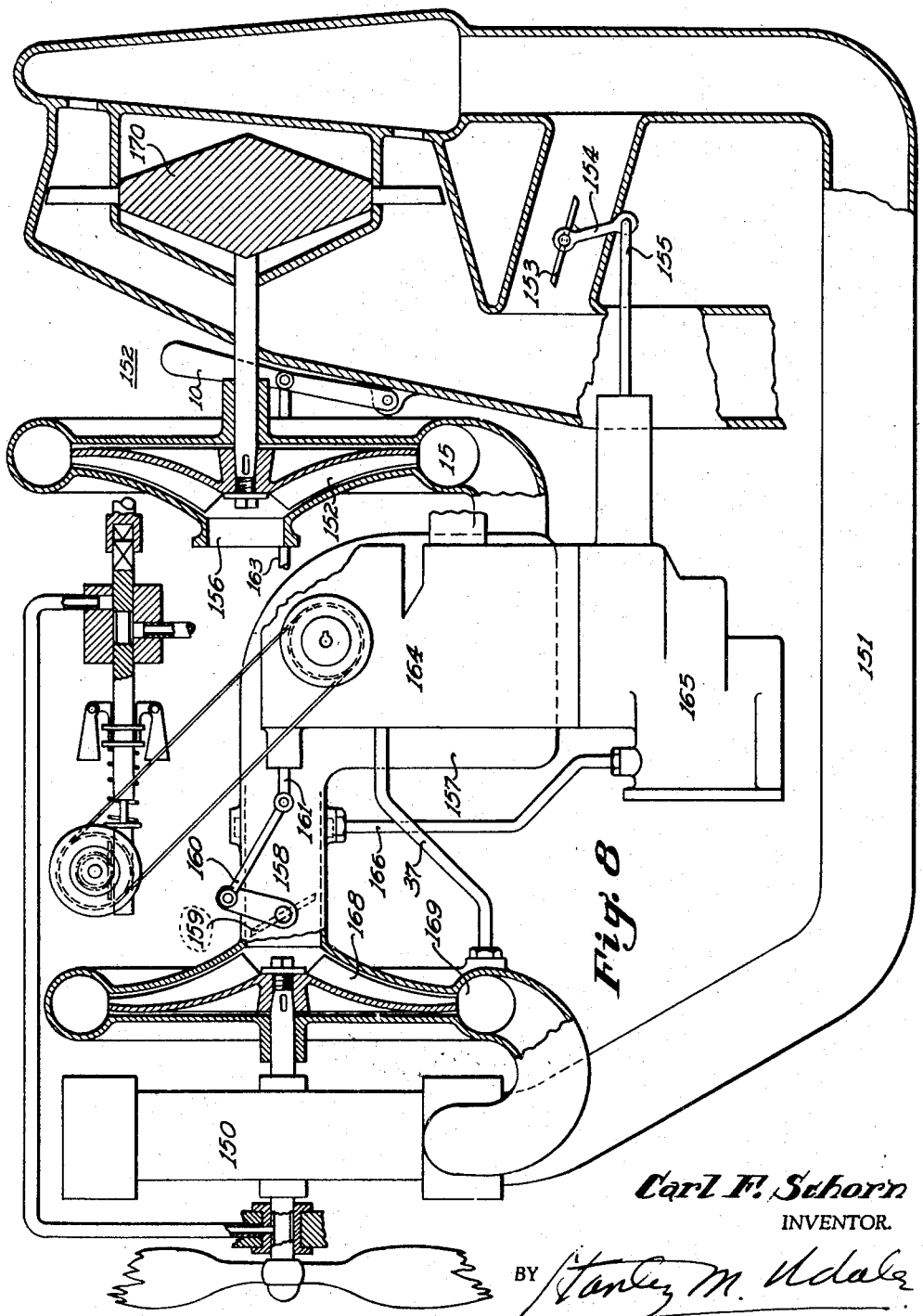

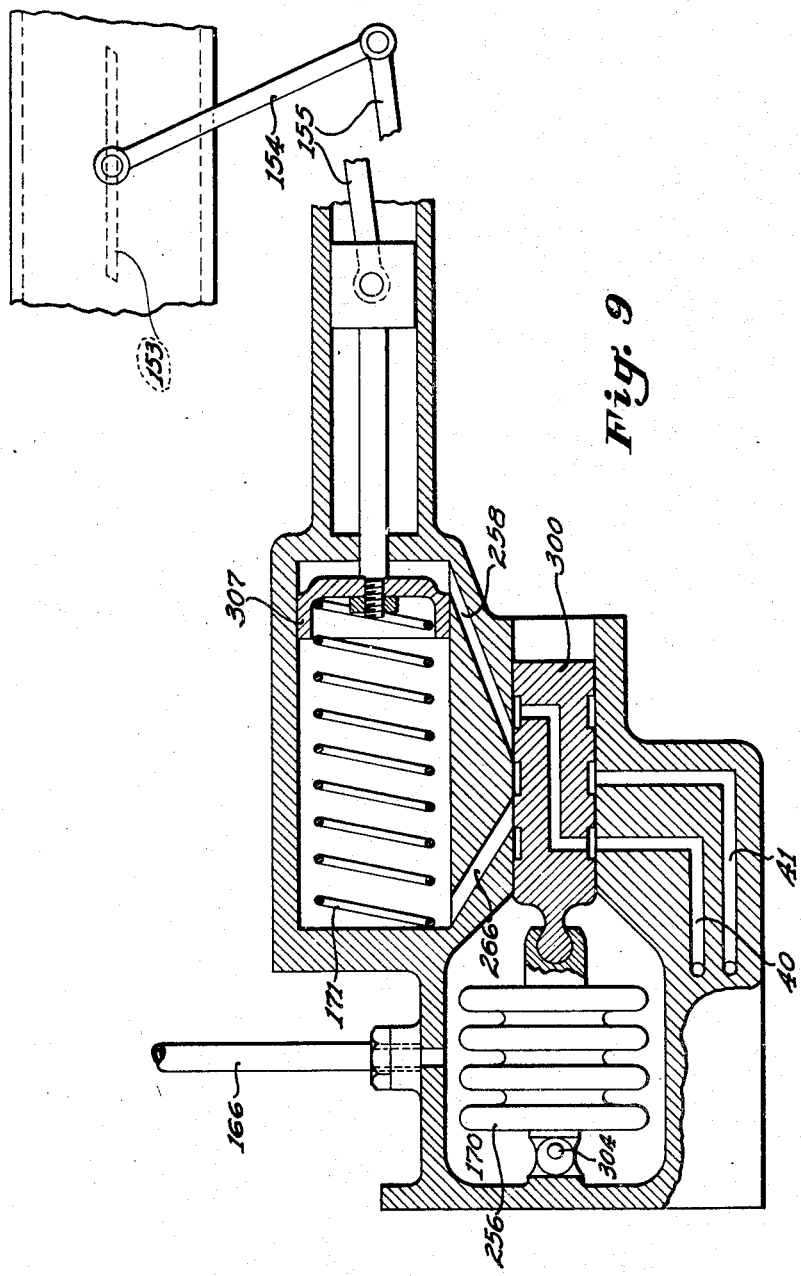

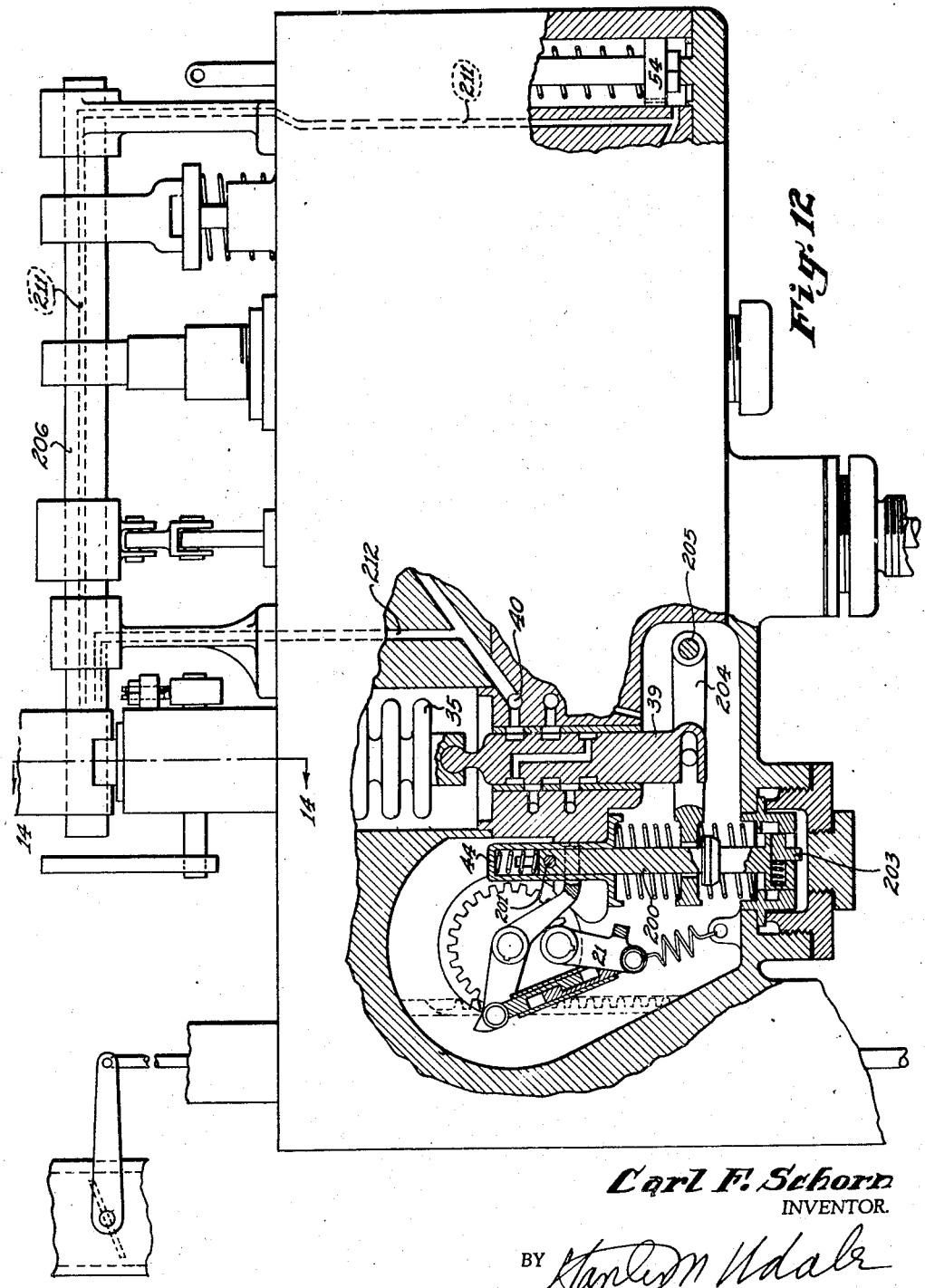

Oct. 7, 1947.                    C. F. SCHORN                    2,428,531
                                 POWER CONTROL
                     Filed May 17, 1943          8 Sheets-Sheet 8
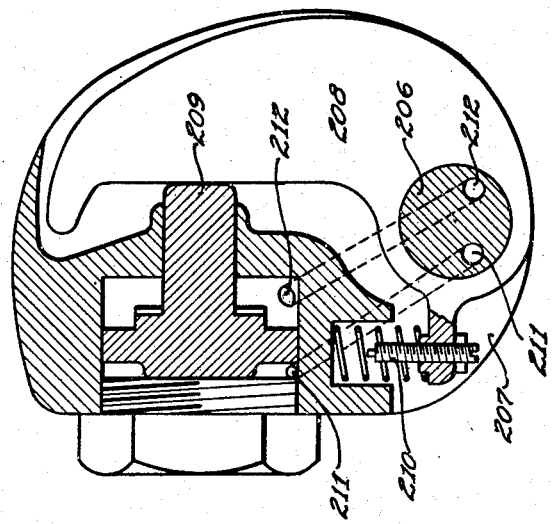
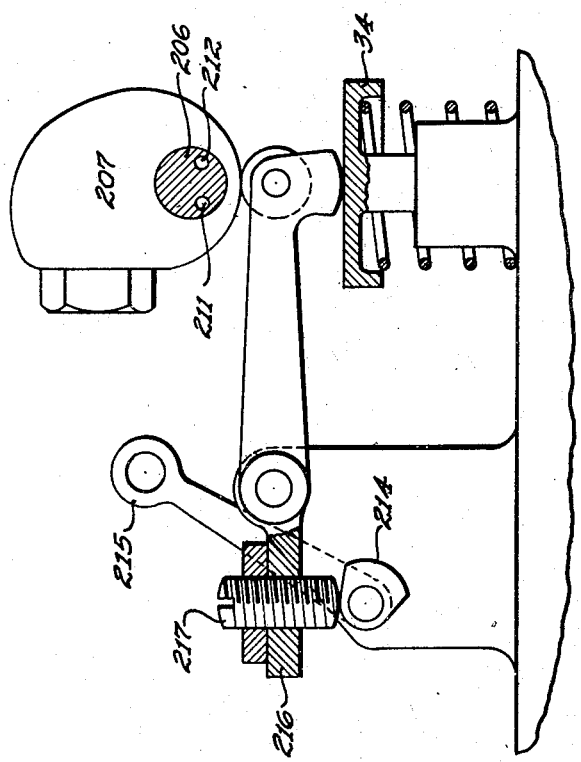
Carl F. Schorn
INVENTOR.
BY
ATTORNEY Patented Oct. 7, 1947

2,428,531

UNITED STATES PATENT OFFICE 2,428,531

POWER CONTROL

Carl F. Schorn, Detroit, Mich., assignor to George M. Holley and Earl Holley

Application May 17, 1943, Serial No. 487,229

23 Claims. (Cl. 170—135.6)

The object of this invention is to simplify the controls of an airplane engine induction system. Generally, it is necessary to control the relationship between engine speed and manifold air pressure. Specifically, it is desirable to relieve the pilot from the exercise of any discretion so that he can concentrate on the business at hand. At the same time, provision must be made so that he can in an emergency, especially in a military emergency, exceed the safe limit of horse power and of torque. Another object of this invention is to automatically permit the manual operation of these various devices when the automatic devices are put out of action.

Fig. 2 shows the control devices illustrated in Fig. 1, in greater detail.

Fig. 3 shows a cross sectional plan view of the plane 3—3 of Fig. 2.

Fig. 4 shows one of the principal details of Fig. 2 in the position for obtaining maximum power.

Fig. 6 shows diagrammatically the relationship between manifold air pressure and engine speed.

Fig. 7 shows the relationship between the altitude and power delivered to the propeller when the engine is automatically controlled by the device illustrated in Figs. 1-5.

Fig. 8 shows the application of my invention to an engine having a turbo driven supercharger.

Fig. 9 shows an enlarged detail in the control shown in Fig. 8.

Figs. 10 and 11 show two positions of the valve shown on the right hand side of Fig. 2.

Figures 1, 5:
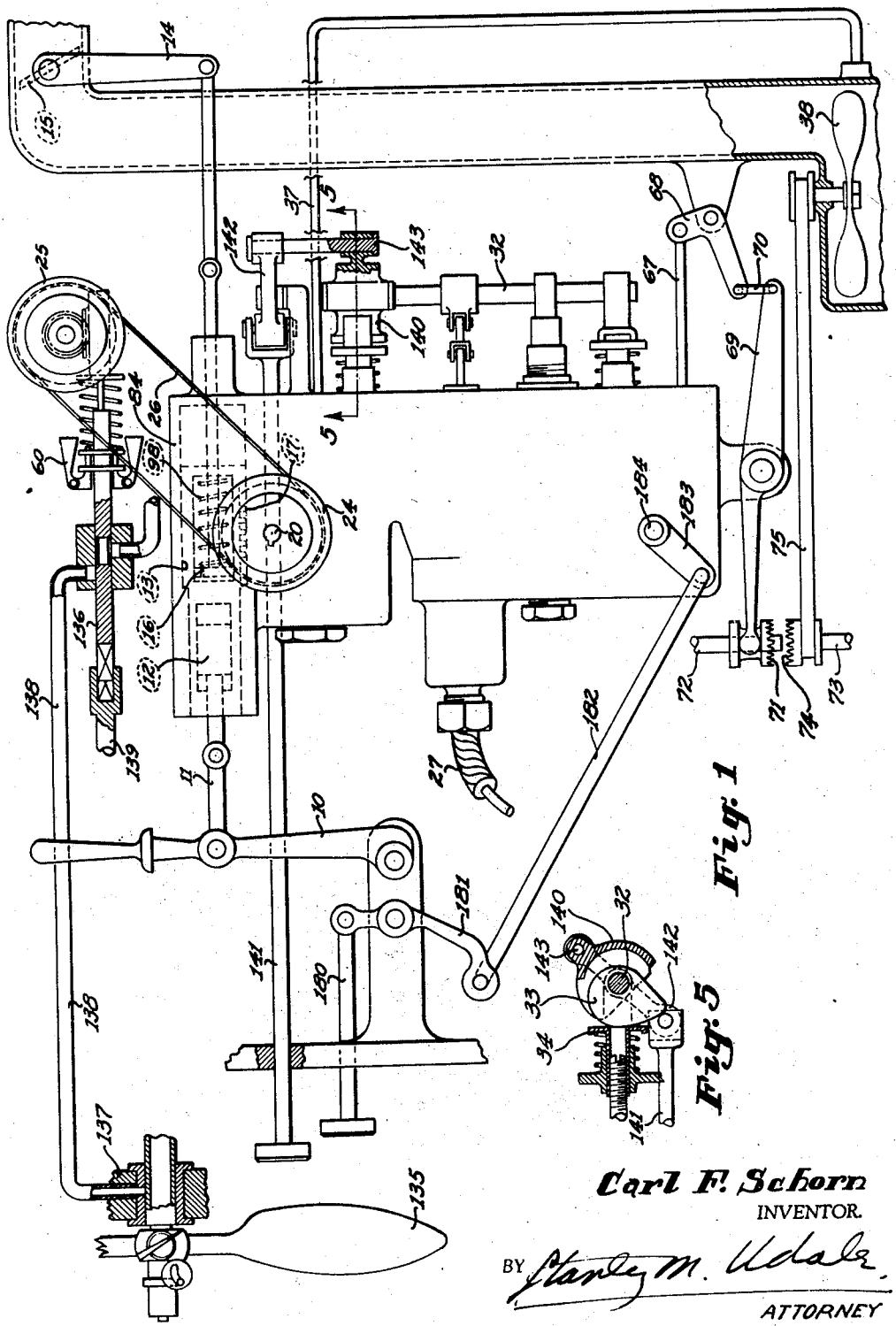
Fig. 1 shows the general arrangement of the preferred form of my invention.
Fig. 5 shows a partial sectional plan view taken on the plane 5—5 of Fig. 1.

In Fig. 10, the valve is shown in the position in which the supercharger driven gear is locked in low.

In Fig. 11, the valve is shown in the position which reverses the normal operation of the supercharger gear shift mechanism.

Fig. 12 shows an alternative construction in which control device illustrated in Figs. 1 and 2 is modified in certain respects.

Fig. 13 shows the manifold air pressure control cams shown in the modified Fig. 12 looking at the plane 13—13 of Fig. 12.

Fig. 14 shows the detail of the cam shown in Fig. 13 to a larger scale.

In Fig. 1, 10 shows the cockpit manual control lever 10 connected to a link 11 and so with a servomotor valve 12 concentrically arranged within the servomotor piston 13. This piston 13 has two diameters and operates in the cylinders located in the stationary body 84.

Concentrically located within the larger of the two diameters is a piston 16 spring loaded to the left by compression spring 98. This piston 16 is connected to the throttle lever 14 which controls the throttle valve 15, which throttle controls the admission of air to an engine driven supercharger 38 which supplies air under pressure to the engine.

When the servomotor valve 12, Fig. 3 moved to the right of the neutral position shown, high pressure oil is admitted from passage 41 and flows through the passage 85 of piston 13 through the passage 86 and port 87 in the valve 12 through the port 88 in the piston 13 through the passage 89 in the piston 13 into the annular chamber 90 which is formed by reason of the fact that piston 13 has two diameters. This high pressure oil pushes piston 13 to the right and opens the throttle 15.

Low pressure oil meanwhile escapes from the chamber 91 through the passage 92 and port 93 in piston 13 port 94 and passage 95 in the valve 12 passage 96 in piston 13, passage 97 in the housing 84 and so to the low pressure oil outlet 40. The piston 13 continues to move until ports 88 and 93 are closed. It follows that for each movement of valve 12 there is substantially an equal movement of piston 13.

A rack is provided in the right hand side of large diameter piston 13 (Fig. 2). This rack engages the pinion 18 so that an upward movement of piston 13 to open the throttle, causes the pinion 18 and the lever 22 mounted therewith to rotate clockwise.

The lever 22 is connected through a pin joint 62 to a broken link 23 which is connected through a pin joint 61 to a lever 21 mounted on the shaft 20. The movement of the cockpit lever 10 clockwise, therefore causes the throttle to be initially opened less than the degree of opening that will finally be required and at the same time rotates the shaft 20 clockwise to select the speed desired. Keyed to the shaft 20 is the engine speed control pulley 24, Fig. 1. A clockwise rotation of pulley 24 causes the pulley 25 to rotate clockwise by means of the transmission belt 26 which connects the two pulleys together. This rotation of the pulley 25 adjusts the spring load on the governor 60 which controls the speed of the variable pitch propeller 135 by means of the servomotor valve 136, which controls the servomotor 137 by means of the hydraulic transmission pipe 138. The details of the servomotor 137 which controls the pitch of propeller 135 are not shown as they are not part of this invention. The governor 60 is driven by the shaft 139 which is rotated at engine speed or at some definite relationship to engine speed.

Since the speed control mechanism is ineffective below approximately 1,200 R. P. M. and since the engine speed below 1,200 R. P. M. is a function of throttle position only, it is necessary to provide the lost motion link 23, Fig. 2. This link permits the movement of the throttle 15, by the action of piston 13 from the closed throttle position to that corresponding to 1,200 R. P. M., the position shown, before the speed control shaft begins to rotate. A shaft 27, Fig. 2 is also driven by a flexible tachometer drive connected to an engine accessory drive at engine speed or at a fraction of engine speed. A governor 28 is driven by shaft 27 and controls the position of servomotor valve 29 which is located concentrically within and controls a servomotor piston 30 which rotates the shaft 32 through the lever 121 which is connected by a link 31 to the servomotor piston 30.

High pressure oil for operating the servomotor 30 is admitted through the passage 41 and low pressure oil escapes through the passage 40. The rotation of the shaft 32 causes cam 33 to engage with the spring loaded cam follower 34 which compresses the evacuated capsules 35 which are located in chamber 36 which chamber communicates with pipe 37 with the supercharger 38 (Fig. 1). Connected to the capsules 35 is the servomotor valve 39 (Fig. 2), which controls the movement of piston 16 in the cylinder within the larger diameter of the two diameter piston 13. The initial opening of the throttle 15 in response to the movement of the piston 13 described above, is insufficient to give the desired relationship between the engine speed and the manifold air pressure. The capsules 35 are thus expanded from the length shown and the servomotor valve 39 is moved down from the neutral position shown. High pressure oil from passage 41 is placed in communication through an annular port in servomotor valve 39 with the underside of the piston 16 through the passage 42 causing it to rise. Low pressure oil is permitted to escape from the upper side of piston 16 through passage 43 and through the upper annular port of valve 39 to the low pressure oil passage 40. The piston 16 continues to open the throttle 15 until the manifold air pressure and therefore the pressure in chamber 36 reach the desired value at which time the increase in pressure has caused the capsules 35 to decrease in length to return the servomotor valve 39 into the neutral position shown. It is apparent that the manifold air pressure at which the servo valve 39 is moved into its neutral position is a function of the positioning of top of the capsule assembly 35. If the capsule assemblies are further depressed by the action of cam 33, it will require a higher pressure in chamber 36 to collapse the capsule assembly still further to return the valve to its neutral position. Since the cam 33 is rotated into a definite position at each engine speed, it follows that the contour of cam 33 will determine the relationship that will exist between manifold air pressure and engine speed.

As the throttle lever 10 is moved clockwise to rotate the speed control shaft 20 to a position corresponding to maximum engine speed, the manifold air pressure follows the curve LMNPQ of Fig. 6 in which the manifold air pressure is plotted against the speed. When the point Q is reached and the throttle 15 has been opened by the action of pistons 13 and 16 to a position corresponding to normal maximum supercharger pressure, the parts 18, 22, 62, 63, 61, 21, and 20 assume the position shown in Fig. 4 in which position a projection 63 on the end of lever 22 engages with a pin 44. It will be noted that in the position shown in Fig. 4, farther rotation of the pinion 18 causes the lever 21 to rotate only a negligible amount. A lever 46, Fig. 2, is pivoted at 122 at its left end. The right end engages with the valve 39. Compression springs 45 and 47 oppose each other and they together with the capsule 35 maintain the lever 46 in equilibrium. The lower spring 47 is accessible for convenient adjustment and modification. A downward movement of pin 44, Fig. 4, compresses the spring 45 and the lever 46 is thus moved clockwise and the valve 39 is thus moved downwardly out of the neutral position in which it is shown so that high pressure oil is admitted through the passage 41, is admitted to the underside of piston 16 and throttle 15 is opened further to raise supercharger pressure along the line QRS, Fig. 6.

The resulting increase in supercharger pressure is obtained with only a negligible increase in the revolution per minute of the engine. In other words, the line QRS is substantially vertical.

Fig. 5 shows a manual means whereby the supercharger pressure can be increased beyond the pressures determined by the action of cam 33 so that a pressure of 29.2" Hg can be obtained at 1,400 R. P. M. instead of 19" Hg automatically called for by the contour of cam 33. For more economical engine operation, it is desirable to operate the engine at this pressure of 29.2" Hg at 1,400 R. P. M., and to maintain this 29.2" of supercharger pressure constant up to 2,100 R. P. M.

The shaded position MON of Fig. 6, corresponds to the "cruising over ride" zone. To obtain this "cruising over ride," a manually operated cam 140 is mounted on the shaft 32 around the cam 33. The cam 140 is rotated by means of the push and pull shaft 141 which is connected to the lever 142 which rotates the cam 140 by means of the pin 143. When this cam is rotated, it depresses the cam follower 34, Fig. 2, thereby lowering the top of the capsule assembly 35 and causes valve 49 to descend and as is described above, causes the throttle 15 to open until the pressure in chamber 36 reaches 29.2" Hg. In the normal course of operation, the shaft 32 is rotated in response to increasing engine speed and the cam 33 remains ineffective until the engine speed has reached 2,100 R. P. M. at which time the lift of cam 33 equals that of cam 140. This corresponds to point N on the curve LMN in Fig. 6. At engine speeds in excess of 2,100 R. P. M., the cam 33 once more takes over the positioning of the top of capsule 35.

When starting the engine before engine oil under pressure is available and when the throttles are closed and consequently the piston 13 is located to the left of the position shown, piston 105, Fig. 3, is held to the right of the position shown by the compression spring 107 and piston 104 is held to the left of the position shown by the compression spring 106. These pistons take up the lost motion between servo valve 12 and the piston 13 which lost motion under normal engine operating conditions, is needed to permit the servo valve 12 to function. It is to be noted that with the lost motion between valve 12 and piston 13 eliminated and with piston 16 held to the left by the compression spring 98, a direct mechanical link exists between cockpit lever 10 and throttle 15. To permit the free movement of piston 13 in response to the force applied on the cockpit lever 10, it is necessary to provide free communication between the chambers 90 and 91 on each side of the larger diameter of the two diameter piston 13. It is also necessary to make provision for the displacement of the greater volume of oil being displaced from the right chamber 91 than the volume of oil that will be taken into the left chamber 90 when the piston 13 is moved to the right. This is accomplished by the action of piston valve 111 which is located so as to interrupt the passage 174—175. When starting the engine before oil under pressure is available, piston valve 111 is pushed to the left of the position shown by the action of compression spring 112. With the valve in the left position, chambers 90 and 91 are in free communication with each other through the passages 174, 113, and 175. The excessive oil in chamber 91 escapes through passage 114 in valve 111 and through the low pressure oil passage 40.

With the piston in its full left position, the oil passages 42 and 43 are in communication with each other through the passage 118, short circuiting passage 99, and passage 100, therefore (Fig. 2), the servo valve 39 which controls manifold air pressure, the control mechanism is ineffective to move piston 16. It follows that the throttle 15 starting from idle engine speed and continuing up to 1,200 R. P. M. (at which position the piston 13 has moved into the position shown to close the short circuiting passage 99) is positively controlled by the manually operated lever 10. When the engine is started and oil pressure is obtained, oil under pressure flows through passage 85 into the chambers 108 and 102 forcing the piston 105 to the left and 104 to the right thereby centering the servo valve 12. The oil to the left of 105 and to the right of 104 escapes to the low pressure outlet. At the same time, oil under pressure is admitted into the chamber 116 through passage 115 pushing the valve 111 to the right to interrupt the passages 175 and 174. In the case of an oil failure, the system automatically reverts to the manual control system described above.

Oil escape passage 119 (which connects the chamber 117 to the left of piston 16 with the low pressure oil passage 40 through passages 97 and 119, 118, and 101 when piston 13 is moved left from the position shown in Fig. 3 to open this bypass 119) is provided to permit a quick return of piston 16 to its full left position when it is desired to quickly return the engine operation to idle output by pulling the manual control lever 10 back into its idle position.

Let us assume that the plane climbs under conditions corresponding to point N, Fig. 6, that is, at 2,100 R. P. M. and 29.2" mercury, manifold air pressure. As the plane ascends, the throttle will be opened by the control mechanism to maintain this 29.2" mercury at 2,100 R. P. M. of engine and the plane climbs along AB, Fig. 7. At 11,000 feet, the throttle will be wide open. As the plane continues to climb above 11,000 feet, the manifold air pressure and the brake power fall along the line BC. The throttle remains open until at the point C, the manifold air pressure has fallen to approximately 24" mercury. The mechanism shown at the right end of Fig. 2 about to be described then automatically becomes operative and causes the speed of the supercharger to increase so as to restore the manifold air pressure to 29.2" mercury. The throttle 15 is first caused to close somewhat by reason of the increased supercharger pressure acting on the chamber 36 and then caused to open to maintain the manifold air pressure constant at 29.2" mercury during the period the plane is climbing from 16,000 to 18,000 feet—that is, from the point C to point D in Fig. 6. At point D the throttle is again wide open. Thereafter the power falls along the line DE during which time the throttle is wide open. The point C is selected so that loss of power in driving the supercharger at its higher speed balances the gain in power by restoring the manifold air pressure to 29.2" mercury. It is to be noted that when operating along lines BC and DE, the throttle 15 is held against its wide open stop. Under these circumstances, unless special means are provided, oil under pressure in chamber 117 would "back load" the piston 13 and thereby cause objectionable "back loading" on the manual lever 10 located in the cockpit. Since the cross sectional area of chamber 90 is made equal to or larger than the cross sectional area of piston 16 and since a common high pressure oil source is used in both chambers, there is always sufficient force acting on the differential area of the two diameter piston 13 to overcome the "back loading" force created by the oil under pressure in chamber 117. Hence, the problem of "back loading" is eliminated by the inherent characteristics of the design.

*Automatic gear-shift*

The supercharger gear shift at point C, Fig. 7, is obtained by the following mechanism, right hand side of Fig. 2. A cam 52 is keyed to shaft 32 and engages with a spring loaded follower 53 which engages with evacuated capsules 49 located in a chamber 50 which is maintained at atmospheric pressure through a passage 51. This capsule 49 is connected to a servomotor valve 48 which controls a servomotor piston 54 which controls through a link 67, the change of speed of supercharger. At 16,000 feet, the capsule 49 expands due to decreased atmospheric pressure in chamber 50 sufficiently to rotate a bell crank lever 55 mounted on a pivot 64 so as to force a roller 65 past a spring loaded button 56. This lower valve 48 is then past the neutral position shown so that high pressure oil is admitted from the passage 41 through a port in valve 48 to the underside of the piston 54 through the passages 122 and 124. Low pressure oil above the piston 54 escapes through the passages 126 and 128 through the upper annular port in valve 48 to the low pressure oil passage 40. The piston 54 rises through its full travel carrying with it its link 67. This link 67 rotates a bell crank lever 68, Fig. 1, clockwise which raises a link 70 and rotates the lever 69 anticlockwise causing a clutch 71 to engage with a clutch 74 which causes the clutch 74 to rotate faster through an over ride clutch (not shown) mounted inside 74 on shaft 73, which is the low speed driven shaft. The high speed shaft 72 thus drives the clutch 71 and clutch 74 which drives the belt 75 and causes the supercharger 38 to rotate at higher speed. As the plane descends, when the point C, Fig. 7, is reached, the supercharger does not revert to low speed immediately but remains in high speed until the point F is reached, 15,000 feet. At this point, the influence of the increasing atmospheric pressure on the capsule assembly 49 and therefore on the valve 48 has become sufficient to rotate the pressure bell crank lever 55 counter-clockwise, first compressing the spring loaded button 56 and then releasing it. The valve 48 ascends above the neutral position shown in Fig. 2. This places the high pressure oil pressure passage 41 in communication with passage 126 through the annular opening in the valve and through passages 125 and 128 thereby admitting oil above the piston 54. The oil beneath the piston 54 escapes through passages 124 and 122 past the annular opening in valve 48 and out the low pressure outlet 40. The piston moves down to cause the link 67 to be pulled down to restore the supercharger drive to its low speed position, that is to say, the clutch 71 is disengaged from the clutch 74 and the low speed shaft 73 takes up the load and drives the belt 75 and the supercharger 38 at the lower speed. The power immediately increases along line FG, thereafter, the throttle remains wide open along the line GB. At the point B, the supercharger pressure has reached the desired 29.2" of mercury and the throttle is closed by the mechanism already described to maintain 29.2" manifold air pressure and the horse power decreases along the line BA, the speed of engine being constant at all times at 2,100 R. P. M. For best performance, the altitude at which the shift in supercharger speed is made varies with engine speed. Since the cam 52 is rotated as a function of engine speed and since the lift of cam 52 positions top of capsule assembly 49, it is quite obvious that by properly contouring the cam 52 any desired relation between engine speed and supercharger shift, and altitude may be obtained.

It is desirable at above rated engine speed to prevent the clutch 71—74 from being engaged or disengaged and the drive of the supercharger being changed. A cam 76 keyed to the shaft 32 is provided for this purpose. This cam engages with cam follower 77 which is spring loaded by the compression spring 79 and the pressure of this causes a pin 80 to be pushed down in a slot 81 and to carry with it a locking pin 58 thus making lock pin 58 normally an integral part of cam follower 77. The cam follower 77 is forced to engage with cam 76 by the compression spring 78 which is seated in the element 83 and presses upward on lock pin 58. When the engine speed is increased above 2,400 R. P. M. pin 58 is depressed by the cam 76 and engages with spring loaded button 56 pushing it down against the shoulder on element 82 and thereby locking the bell crank lever 55 in either of its two operative positions, that is to say, either the with servomotor valve 48 in its above neutral position or in its below neutral position. Element 83 also provides a seat for the compression spring 57 and serves as a means to adjust the compression load of spring 57. Safety spring 79 is provided to protect the mechanism from being jammed if the shaft 32 were rotated with the lever 55 in the position shown.

It has been found advisable under normal engine operation to shift the supercharger clutch mechanism momentarily after each 2½ hours of engine operation to clear out the oil passages of the clutch system. It is considered advisable also to be able to operate at all altitudes in low supercharger speed ratio. To accomplish this, valve 120, Fig. 2, Fig. 10, Fig. 11, which is manually controllable through the linkage 180, 181, 182, 183 and shaft 184 which is attached to valve 120 is interposed in the oil lines from the servo valve 48 to the cylinder containing piston 54. When the valve is rotated 45 degrees clockwise, into the position shown in Fig. 11 from its neutral position in which it is shown in Fig. 2, passage 128 communicates with passage 124 and passage 122 is in communication with passage 126. By this means, the supercharger speed is shifted from its operating speed to either high speed or low speed depending on speed at which it is operating at the time the shift is made.

When the valve 120 is rotated 45 degrees counter-clockwise into the position shown in Fig. 10, passages 126, 124, 128, and 122 are all in communication with each other through the passage 127 located in the stationary center section of the valve assembly. With all of the oil passages in communication with each other, the piston 54 is forced down and held by the compression spring 66 into the lowered position shown in Fig. 2 which position corresponds to the low speed ratio operation of the supercharger.

*Exhaust driven supercharger*

In Fig. 8, 150 indicates the engine, 151 indicates the exhaust passage delivering the exhaust to the impeller 170 of the turbo-supercharger 152. This supercharger is controlled by an exhaust valve 153 connected by means of a throttle lever 154 to a rod 155. The turbo-supercharger takes in air at an entrance 156 and passes it through a cooler 157 to a carburetor 158 having a throttle 159 corresponding to the throttle 15 of Figs. 1 and 2. The throttle 159 is controlled by throttle lever 10 through links 160 and 161. Box 164 encloses the mechanism shown in the left hand side of Fig. 2 omitting the means for shifting the change speed drive means of the two speed supercharger. This supercharger control mechanism shown on the right of control device in Fig. 2 is replaced by the control unit 165 which is controlled by the pressure of air entering the carburetor. This pressure is made effective through the pipe 166. The carburetor outlet communicates with air entrance leading to the engine driven supercharger 168 which delivers the compressed mixture to the manifold 169 which supplies mixture to the engine 150. As in Fig. 1, a pipe 37 connects the throttle control unit 164 with the manifold 169.

In Fig. 9, the pipe 166 is shown connected with the chamber 170 in which there is located an evacuated bellows 256 which may be adjustably located by means of the eccentric element 304. The evacuated capsule engages with the servomotor valve 300. This servomotor valve 300 controls the piston 307 by means of the passages 266 and 258. The location of the top of the capsule assembly 256 is adjusted by means of eccentric 304 so that when the pressure in the carburetor inlet exceeds that corresponding to 7,000 feet, the length of the capsule assembly 256 is such that the servo valve 300 is left of the neutral position shown. At altitudes below 7,000 feet, high pressure oil communicates through the passage 41 flows through the annular passage in the servomotor valve 300 through the passage 266 and holds piston 307 to the right, the position shown in Fig. 9. The piston 307 and its connecting rod engages the exhaust valve 153 through the link 155 therefore, the valve is held open reducing the effectiveness of the turbo-supercharger 152. When the plane ascends above 7,000 feet and the pressure in the carburetor inlet tends to fall below those corresponding to the 7,000 feet atmospheric pressure, the capsule assembly 256 expands sufficiently to move the servomotor valve 300 to the right of the neutral position shown and high pressure oil flows from 41 through the annular passage in the servomotor valve 300 through the passage 258 and pushes the piston 307 to the left compressing a spring 171. Meanwhile, low pressure oil from the left of piston 307 escapes through passage 266, through the annular passage in servomotor valve 300 out the low pressure oil passage 40. Piston 307 continues to move to the left, thereby closing valve 153 forcing more of the exhaust gases to pass through motor of the turbo-supercharger. The speed of the supercharger is increased causing an increase in air pressure in the carburetor inlet. The piston 307 continues to move to the left until the pressure in the carburetor inlet equals that corresponding to 7,000 feet altitude at which time the pressure in the chamber 170 causes the capsule length to return to that length necessary to return the servomotor valve to the neutral position shown.

The performance of an engine equipped with the supercharger and control systems shown in Fig. 8 and Fig. 9 would be as follows: The plane would ascend along the constant speed and constant manifold air pressure line AB, Fig. 7, until point H is reached and then continues to ascend along the substantially constant power line HJ. At J, the exhaust valve 153 has been pushed to its closed position, the throttle 159 has become opened to its wide open position. A continued climb causes power to fall off along JK.

The reason the power remains substantially constant from point H to J is that the back suction on the engine exhaust system above 7,000 altitude is maintained substantially constant by the operation of the exhaust valve 153.

Above 14,000 feet there is a marked advantage in horse power with the turbo-supercharger over the gear driven supercharger. However, the loss in jet propulsion when the exhaust is used to drive the supercharger cancel some of the gains especially at extreme speeds. Hence, the gain is more pronounced with a bomber than with a fighter.

The use of two governors is justified by the fact that the second governor is built into the power control and serves to make the operation of the control independent of the inconsistences due to hysteresis and tolerance found in the governor built into the propeller assembly.

The use of the second governor makes my unit self contained, capable of being calibrated on a test bench, independent of the propeller unit or plane installation.

Fig. 12 shows a means for locking the evacuated capsule assembly 35 out of action in the event that this capsule is ruptured and it will tend to expand. In Fig. 12, the lever 22 is provided with a fork which extended to the right and which engages with a pin 201 guided in a slot in the hollow stem 44. Pin 201 engages with a rod 200 which slides inside the hollow stem 44. The rod 200 then compresses a spring which normally holds the rod 200 in the position shown. When the gear 18 is rotated anticlockwise, the forked extension of lever 22 engages with pin 201 and thus raises the vertical shaft 200. A shoulder 202 on the shaft 200 then engages with a lever 204 and rotates it around a pin 205 which corresponds to the pin 122 of Fig. 2. Lever 204 corresponds to the lever 46 of Fig. 2. When this happens, the servomotor valve 39 is lifted above its neutral poistion in which it is shown. A spring loaded locking pin 203 locks the shaft 200 in this elevated position. With the valve 39 thus elevated, high pressure oil is admitted above the piston 16 forcing it into a downward position (Fig. 2) in which the position and control of the throttle valve 15 is entirely dependent upon the manual operation of cockpit lever 10.

In Figs. 12, 13, and 14 the shaft 206 corresponds to cam shaft 32, Fig. 2. This shaft 206 is keyed to the cam 207, Fig. 14, which cam compares with the cam 33 of Fig. 2. An additional cam 208 is rotatably mounted on shaft 206. The range of rotation of cam 208 is limited in the clockwise direction by an adjustable stop 210 and its movement is limited in the opposite direction, anticlockwise, by a movable stop 209. This movable stop 209 is moved by the oil under pressure admitted through the passage 211 which passage is located in shaft 206 and which passage communicates with cylindrical chamber below piston 54, Fig. 12. The other oil passage 212 communicates with the low pressure oil system 40 and with the right hand side of the piston operating the stop 209. The operation of mechanism just described is as follows:

When the engine is put in low supercharger gear and consequently piston 54 is in position shown in drawing the cam 207 selects the manifold air pressure for each speed as before. When high pressure oil is admitted below the piston 54 to change gear ratio to high supercharger gear ratio, then high oil pressure is admitted to move the stop 209 to the right, compressing the spring 213 and substituting the cam 208 for cam 207, which thus gives an alternative relationship between speed and manifold air pressure in high blower.

In Fig. 13, the manually operated cam 214 corresponds to cam 140, of Fig. 2. When the lever 215 is manually moved in the anticlockwise direction, cam 214 rotates clockwise the lever 216 through the adjustable stop 217 which lowers the cam follower 34 so as to obtain the cruising override performance curve ON shown in Fig. 6.

What I claim is:

1. In combination with an internal combustion engine having an engine driven supercharger adapted to deliver air to said engine, an air entrance to said supercharger and a throttle valve, control linkage therefor adapted to control the air flow through the air inlet, a variable pitch propeller driven by said engine having a spring loaded centrifugal governor adapted to control the engine speed by varying the pitch of said propeller, a control linkage for said governor adapted to select the speed of the engine by varying the load of the governor spring, a manually operated control lever, a motion transmission system connecting said control lever to said throttle valve control linkage and also connecting said lever to said control device for said propeller governor control, a second engine driven centrifugal governor, a barometric responsive device, a variable pressure chamber enclosing said barometric device, a pipe connecting said chamber to the air inlet on the engine side of said supercharger, a servomotor valve controlled by said second centrifugal device and by said barometric means, a servomotor controlled by said valve said motor being interposed in said motion transmission system whereby after the throttle has been manually opened a relatively small amount, it is opened automatically an additional amount by said servomotor so as to maintain in the outlet from said supercharger a preselected pressure, corresponding to the selected engine speed.

2. A device as set forth in claim 1 in which there is a supercharger drive having two speed ratios at either of which the supercharger may be driven, means for automatically selecting the speed comprising a second barometric means responsive to the atmospheric pressure, a second servomotor valve adapted to be controlled by both said second centrifugal governor and by said second barometric device, means for selecting the speed ratio of said supercharger comprising a second servomotor responsive to and controlled by said second servomotor valve adapted to select the speed of the supercharger at a preselected altitude corresponding to each selected engine speed so as to maintain the pressure entering the engine at the desirable value corresponding to the selected engine speed.

3. Device as set forth in claim 1 in which the said motion transmission system connection comprises a two diameter piston adapted to slide in a two diameter stationary cylinder and in which a second servomotor valve is located within the smaller diameter of said two diameter piston and adapted to move the said two diameter piston in the direction of the movement of said servomotor valve by an amount substantially equal to the movement of said servomotor valve by admitting high pressure oil either into the annular chamber created by the difference in diameter of the two diameter piston or into the chamber formed by the opposite face of larger diameter of the two diameter piston and the cylinder walls, low pressure oil meanwhile being permitted to escape from the chamber to which the high pressure oil is not admitted and in which there is a spring loaded smaller piston within the larger diameter of said two diameter piston controlled by said second centrifugal device and by said barometric means said smaller piston being directly connected to said throttle linkage and in which the area of the smaller piston is substantially equal to the difference in the area between the area of the larger diameter and the smaller diameter of the two diameter piston so that the back load on the large piston due to the high oil pressure behind the smaller piston when the throttle is opened wide is substantially balanced by the high oil pressure acting in the annular chamber to push the two diameter piston forward.

4. Device as set forth in claim 1 in which the mechanism connecting the propeller controlling device with the throttle control lever is so designed that when the propeller controlling device approaches the position corresponding to the desired maximum speed of the engine, the influence of the further movement of the throttle control mechanism on the speed of the engine becomes negligible although its influence on the controlled supercharger pressure to increase the manifold air pressure of the engine continues by means of spring loading the said servomotor valve thereby producing the same result on the balance of the supercharger pressure control system as an insufficient pressure within the said variable pressure chamber enclosing said barometric device.

5. Device as set forth in claim 1 in which the said motion transmission system connection comprises a two diameter piston adapted to slide in a two diameter stationary cylinder and in which a servomotor valve is located within the smaller diameter of said two diameter piston and adapted to move the said two diameter piston in the direction of the movement of said servomotor valve by an amount substantially equal to the movement of said servomotor valve by admitting high pressure oil either into the annular chamber created by the difference in diameter of the said two diameter piston or into the chamber formed by the opposite face of larger diameter of the two diameter piston and the cylinder walls, low pressure oil meanwhile being permitted to escape from the chamber to which the high pressure oil is not admitted and in which there is a spring loaded smaller piston within the larger diameter of said two diameter piston controlled by said second centrifugal device and by said barometric means said smaller piston being directly connected to said throttle linkage and in which the area of the smaller piston is substantially equal to the difference in the area between the area of the larger diameter and the smaller diameter of the two diameter piston so that the back load on the large piston due to the high oil pressure behind the smaller piston when the throttle is opened against its wide open stop is substantially balanced by the high oil pressure acting in the annular chamber to push the two diameter piston forward and in which there exists within the motion transmission system spring loaded pistons adapted automatically to take up the lost motion that would otherwise exist between the ends of the servomotor valve contained in the cylinder located within the smaller diameter of the two diameter piston and the end walls of the said cylinder when starting the engine before high oil pressure exists said spring loaded pistons being adapted to automatically release the said servomotor valve when the oil pressure increases in response to the rotation of the engine.

6. Device as set forth in claim 1 in which the said motion transmission system connection comprises a two diameter piston adapted to slide in a two diameter stationary cylinder and in which a servomotor valve is located within the smaller diameter of said two diameter piston and adapted to move the said two diameter piston in the direction of the movement of said servomotor valve by an amount substantially equal to the movement of said servomotor valve by admitting high pressure oil either into the annular chamber created by the difference in diameter of the two diameter piston or into the chamber formed by the opposite face of larger diameter of the two diameter piston and the cylinder walls, low pressure oil meanwhile being permitted to escape from the chamber to which the high pressure oil is not admitted and in which there is a spring loaded smaller piston within the larger diameter of said two diameter piston controlled by said second centrifugal device and by said barometric means, said smaller piston being directly connected to said throttle linkage and in which the area of the smaller piston is substantially equal to the difference in the area between the area of the larger diameter and the smaller diameter of the two diameter piston so that the back load on the large piston due to the high oil pressure behind the smaller piston when the throttle is opened against its wide open stop is substantially balanced by the high oil pressure acting in the annular chamber to push the two diameter piston forward and in which there exists within the motion transmission system spring loaded pistons adapted automatically to take up the lost motion that would otherwise exist between the ends of the servomotor valve contained in the cylinder located within the smaller diameter of the two diameter piston and the end walls of the said cylinder when starting the engine before high oil pressure exists said spring loaded pistons being adapted to automatically release the said servomotor valve when the oil pressure increases in response to the rotation of the engine and in which there exists an oil escape passage connecting the chambers formed by the stationary cylinder and the end faces of the larger diameter of the two diameter piston and an automatic shut off valve within the said oil escape passage so adapted that when starting the engine before high oil pressure exists a free communication exists between the said chambers and the low oil pressure side of the system enabling the free movement of said two diameter piston and so adapted that as the engine begins to function the automatic valve stops the escape passage joining the said two chambers and stops the escape passage from the low oil pressure side of the system.

7. Device as set forth in claim 1 in which there is a supercharger drive having two speed ratios at either of which the supercharger may be driven, means for automatically selecting the speed comprising a second barometric means responsive to the atmospheric pressure, a servomotor valve adapted to be controlled by both said second centrifugal governor and by said second barometric device, means for selecting the speed of said supercharger comprising a servomotor responsive to and controlled by said second servomotor valve adapted to select the speed of the supercharger at a preselected altitude corresponding to each selected engine speed so as to maintain the pressure entering the engine at the desirable value corresponding to the selected engine speed and in which there exists a valve interposed in the oil lines from the servomotor valve and the spring loaded servomotor piston adapted when moved to change the supercharger speed so that the supercharger speed ratio can be manually changed at any time by the movement of said interposed valve from its neutral position and also by an additional or opposite movement of the valve from its neutral position the supercharger can be maintained in low speed ratio independently of engine speed or altitude.

8. Device as set forth in claim 1 in which there is a supercharger drive having two speed ratios at either of which the supercharger may be driven, means for automatically selecting the speed comprising a second barometric means responsive to the atmospheric pressure, a servomotor valve adapted to be controlled by both said second centrifugal governor and by said second barometric device, means selecting the speed of said supercharger comprising a servomotor responsive to and controlled by said second servomotor valve adapted to select the speed of the supercharger at a preselected altitude corresponding to each selected engine speed so as to maintain the pressure entering the engine at the desirable value corresponding to the selected engine speed and in which there exists a trip over mechanism comprising a lever and a spring loaded snap button and a means to adjust the spring load on the said snap button, a lever attached to the said servomotor valve and adapted to cause the said valve to snap through its neutral position by first depressing and then releasing said snap button so that the action of the said servomotor valve will cause the said servomotor piston to travel unhesitatingly either to low or high supercharger speed ratio position.

9. A device as set forth in claim 1 in which there is a supercharger drive having two speed ratios at either of which the supercharger may be driven, means for automatically selecting the speed comprising a second barometric means responsive to the atmospheric pressure, a servomotor valve adapted to be controlled by both said second centrifugal governor and by said second barometric device, means for selecting the speed of said supercharger comprising a servomotor responsive to and controlled by said second servomotor valve adapted to select the speed of the supercharger at a preselected altitude corresponding to each selected engine speed so as to maintain the pressure entering the engine at the desirable value corresponding to the selected engine speed and in which there exists trip over mechanism comprising a lever and a spring loaded snap button and a means to adjust the spring load on the said snap button, a lever attached to the said servomotor valve and adapted to cause the said valve to snap through its neutral position by first depressing and then releasing said snap button so that the action of the said servomotor valve will cause the said servomotor piston to travel unhesitatingly either to low or high supercharger speed ratio position and in which there exists a spring loaded compressible shaft which is controlled by means of a cam which is positioned by the action of said second centrifugal governor and which shaft is adapted to contact said spring loaded snap button at a predetermined speed and all engine speeds in excess of said predetermined speed to force in downward so that the said servo valve controlling the supercharger shift servomotor piston is held on either side of its neutral position.

10. Device as set forth in claim 1 in which the said motion transmission system connection comprises a two diameter piston adapted to slide in a two diameter stationary cylinder and in which a servomotor valve is located within the smaller diameter of said two diameter piston and adapted to move the said two diameter piston in the direction of the movement of said servomotor valve by an amount substantially equal to the movement of said servomotor valve by admitting high pressure oil either into the annular chamber created by the difference in diameter of the said two diameter piston or into the chamber formed by the opposite face of larger diameter of the two diameter piston and the cylinder walls, low pressure oil meanwhile being permitted to escape from the chamber to which the high pressure oil is not admitted and in which there is a spring loaded smaller piston within the larger diameter of said two diameter piston controlled by said second centrifugal device and by said barometric means said smaller piston being directly connected to said throttle linkage and in which the area of the smaller piston is substantially equal to the difference in the area between the area of the larger diameter and the smaller diameter of the two diameter piston so that the back load on the large piston due to the high oil pressure behind the smaller piston when the throttle is opened against the wide open stop is substantially balanced by the high oil pressure acting in the annular chamber to push the two diameter piston forward and in which the porting of the said two diameter piston and said stationary cylinder is such so that said servomotor interposed in said straight through motor transmission system is made inoperative when the said two diameter piston is moved to a position corresponding to low engine speeds and low engine power output.

11. Device as set forth in claim 1 in which the said motion transmission system connection comprises a two diameter piston adapted to slide in a two diameter stationary cylinder and in which a servomotor valve is located within the smaller diameter of said two diameter piston and adapted to move the said two diameter piston in the direction of the movement of said servomotor valve by an amount substantially equal to the movement of said servomotor valve by admitting high pressure oil either into the annular chamber created by the difference in diameter of the two diameter piston or into the chamber formed by the opposite face of larger diameter of the two diameter piston and the cylinder walls, low pressure meanwhile being permitted to escape from the chamber to which the high pressure oil is not admitted and in which there is a spring loaded smaller piston within the larger diameter of said two diameter piston controlled by said second centrifugal device and by said barometric means said smaller piston being directly connected to said throttle linkage and in which the area of the smaller piston is substantially equal to the difference in the area between the area of the larger diameter and the smaller diameter of the two diameter piston so that the back load on the large piston due to the high oil pressure behind the smaller piston when the throttle is opened against the wide open stop is substantially balanced by the high oil pressure acting in the annular chamber to push the two diameter piston forward and in which there exists a manually operated cam to control the position of said barometric element and thus over ride the control of said second centrifugal governor so that higher controlled manifold air pressure can be obtained at any engine speed than would normally be called for by the centrifugal governor control mechanism.

12. Device as set forth in claim 1 in which the said motor transmission system is located between the said manually operated control lever and the said throttle valve control linkage and is arranged so as to give a straight through transmission system with the said servomotor concentrically arranged within said system.

13. Device as set forth in claim 1 in which there is a supercharger drive having two speed ratios at either of which the supercharger may be driven, means for automatically selecting the speed comprising said barometric means responsive to the atmospheric pressure, a second servomotor valve adapted to be controlled by both said second centrifugal governor and by said second barometric device, means for selecting the speed ratio of said supercharger comprising a second servomotor responsive to and controlled by said second servomotor valve adapted to select the speed of the supercharger at a preselected altitude corresponding to each selected engine speed so as to maintain the pressure entering the engine at the desirable value corresponding to the selected engine speed, and in which the said motor transmission system is located between the said manually operated control lever and the said throttle valve control linkage and is arranged so as to give a straight through transmission system.

14. Device as set forth in claim 1 in which the said motion transmission system connection comprises a two diameter piston adapted to slide in a two diameter stationary cylinder and in which a second servomotor valve is located within the smaller diameter of said two diameter piston and adapted to move the said two diameter piston in the direction of the movement of said servomotor valve by an amount substantially equal to the movement of said servomotor valve by admitting high pressure oil either into the annular chamber created by the difference in diameter of the two diameter piston or into the chamber formed by the opposite face of larger diameter of the two diameter piston and the cylinder walls, low pressure meanwhile being permitted to escape from the chamber to which the high pressure oil is not admitted and in which there is a spring loaded smaller piston within the larger diameter of said two diameter piston controlled by said second centrifugal device and by said barometric means said smaller piston being directly connected to said throttle linkage and in which the area of the smaller piston is substantially equal to the difference in the area between the area of the larger diameter and the smaller diameter of the two diameter piston so that the back load on the large piston due to the high oil pressure behind the smaller piston when the throttle is opened wide is substantially balanced by the high oil pressure acting in the annular chamber to push the two diameter piston forward, and in which the said motor transmission system is located between the said manually operated control lever and the said throttle valve control linkage and is arranged so as to give a straight through transmission system with the said servomotor concentrically arranged within said system.

15. Device as set forth in claim 1 in which an engine exhaust driven supercharger is adapted to delivering air to said first mentioned supercharger and is connected in series therewith on the atmospheric side of said throttle valve, an exhaust throttle valve for controlling the flow of exhaust gases to said exhaust driven supercharger, means responsive to the pressure of the air flowing from said exhaust driven supercharger for controlling said exhaust throttle whereby when the pressure of the air flowing from said exhaust driven supercharger falls below a predetermined value the pressure is restored substantially to that value until all the exhaust gases are being utilized to drive the supercharger.

16. In combination with the device as set forth in claim 1, in which the mechanism connecting the propeller controlling device with the throttle control lever is so designed that when the propeller controlling device approaches the position corresponding to the desired maximum speed of the engine, the influence of the further movement of the throttle control mechanism on the speed of the engine becomes negligible although its influence on the controlled supercharger pressure to increase the manifold air pressure of the engine continues by spring loading the said servomotor valve thereby producing the same result on the balance of the supercharger pressure control system as an insufficient pressure within the variable pressure chamber enclosing said barometric device and in which an exhaust driven supercharger is connected on the atmospheric side of said throttle valve, an exhaust throttling means for controlling the flow of exhaust gases to said exhaust driven supercharger, means responsive to the pressure of the air flowing to said first mentioned throttle for controlling said exhaust throttling means whereby when the said pressure falls below a predetermined value the pressure is restored substantially to that value until all the exhaust gases are being utilized to drive the said supercharger.

17. In combination with an internal combustion engine having an engine driven supercharger and an air passage leading thereto having throttle valve located therein, an engine exhaust driven turbo supercharger connected to the air passage on the atmospheric side of said throttle valve, exhaust throttling means for said second supercharger adapted to control the operation of said supercharger, a variable pitch propeller driven by said engine having spring loaded engine driven centrifugal governor adapted to control the engine speed by varying the pitch of said propeller, control linkage for said governor adapted to select the speed of the engine by varying the load on said governor, spring means for operating said linkage for selected said engine speed, said manually operated means being also adapted to open the throttle to a limited degree, a second engine driven governor, a cam adapted to be controlled by said second governor, a chamber in communication with the engine side of first mentioned supercharger, evacuated capsules adjustably located in said chamber by said cam, a servomotor valve adapted to be moved by the combined effect of the movement of said cam and the expansion of said capsules, servomotor means controlled by said servomotor valve and adapted to still further open said throttle valve until the supercharger pressure reaches the value determined by said cam for said specific speed of the engine, barometric means responsive to the pressure in the air entrance of the atmospheric side of said throttle, said means being connected to said throttling means for said second supercharger and adapted to maintain the said air pressure at the pressure corresponding to a selected altitude by controlling the flow of exhaust gases to said exhaust driven turbo-supercharger.

18. Device as set forth in claim 17 in which there are means for increasing the first mentioned supercharger pressure without increasing the speed of engine when the maximum desirable speed of engine is reached.

19. (Fig. 12). Device as set forth in claim 1 in which the mechanism connecting the propeller control device with the throttle control lever is so designed that when the said manually operated throttle control lever is moved beyond the position of minimum throttle opening corresponding to the minimum speed of engine said servomotor valve is mechanically locked into a position which prevents the said additional opening of said throttle by said servomotor valve and thereby places the control of said throttle exclusively under said manually operated throttle control lever.

20. In combination with an internal combustion engine having an engine driven supercharger adapted to deliver air to said engine, an air entrance to said supercharger and a throttle valve, control linkage therefor adapted to control the air flow through the air inlet, a variable pitch propeller driven by said engine having a spring loaded centrifugal governor adapted to control the engine speed by varying the pitch of said propeller, a control linkage for said governor adapted to select the speed of the engine by varying the load on the governor spring, a manually operated control lever, a motion transmission system connecting said control lever to said throttle valve, control linkage and also connecting said lever to said control device for said propeller governor control, a barometric responsive device, a variable pressure chamber enclosing said barometric device, a passage connecting said chamber to the air inlet on the engine side of said supercharger, a shaft adapted to control the manifold air pressure and to be rotated in response to variations in engine speed, a cam mounted thereon adapted to engage with said barometric device, a servomotor valve controlled by said cam and by said barometric device, a servomotor controlled by said valve said motor being interposed in said motor transmission system, a second cam mounted on said shaft normally adapted to be inoperative but adapted when rotated on said shaft to engage with said barometric means, and in which there is a supercharger drive having two speeds, means for increasing the speed of said supercharger and simultaneously moving said second cam so that it takes the place of said first cam.

21. Device as set forth in claim 20 in which the means for increasing the speed of said supercharger comprises a second barometric means responsive to the atmospheric pressure, a servomotor valve adapted to be controlled thereby and by said manifold air pressure control shaft, a servomotor adapted to be controlled by said servomotor valve, hydraulic means interposed between said first and second cam and controlled by said servomotor and adapted to move said second cam relative to said first cam at the same time as said servomotor valve operates said servomotor to change the gear ratio of said supercharger drive so as to increase the speed of rotation of said supercharger.

22. In combination with an internal combustion engine for an airplane, a supercharger driven thereby and connected to deliver air to said engine, an air entrance to said supercharger, an air throttling valve therefor, an engine exhaust driven supercharger adapted to deliver air to said engine, driven supercharger and connected in series therewith on the atmospheric side of said valve, exhaust throttling means for said exhaust driven supercharger, automatic means responsive to the pressure created by said engine driven supercharger for controlling said first mentioned throttling valve, means responsive to the pressure created by said exhaust turbine driven supercharger for controlling said exhaust throttling means whereby, when the pressure in the exit from said exhaust turbine driven supercharger falls to below a predetermined value, the said pressure is restored substantially to that value until all the exhaust gases are being utilized to drive the supercharger.

23. In combination with an internal combustion engine for an airplane, a supercharger driven thereby and connected to deliver air to said engine, an air entrance to said supercharger, an air throttling valve therefor, a carburetor associated therewith, an engine exhaust driven supercharger adapted to deliver air to said carburetor, exhaust throttling means for said exhaust driven supercharger, automatic means responsive to the pressure created by said engine driven supercharger for controlling said first mentioned throttling valve, means responsive to the pressure created by said exhaust turbine driven supercharger for controlling said exhaust throttling means whereby, when the pressure in the exit from said exhaust turbine driven supercharger falls to below a predetermined value, the said pressure is restored substantially to that value until all the exhaust gases are being utilized to drive the supercharger.

CARL F. SCHORN.

REFERENCES CITED

The following references are of record in the file of this patent:

UNITED STATES PATENTS

| Number | Name | Date |
|---|---|---|
| 2,297,235 | Muller | Sept. 29, 1942 |
| 2,305,810 | Muller | Dec. 22, 1942 |
| 2,285,344 | Marples et al. | June 2, 1942 |
| 2,355,759 | Stokes | Aug. 15, 1944 |

OTHER REFERENCES

Ser. No. 304,834, Boulet (A. P. C.) pub. Apr. 27, 1943.